(12) United States Patent
Grassauer

(10) Patent No.: US 11,506,279 B2
(45) Date of Patent: Nov. 22, 2022

(54) CONTINUOUSLY ADJUSTABLE SHIFTER FOR VEHICLE

(71) Applicant: Erik Daniel Grassauer, Camarillo, CA (US)

(72) Inventor: Erik Daniel Grassauer, Camarillo, CA (US)

( * ) Notice: Subject to any disclaimer, the term of this patent is extended or adjusted under 35 U.S.C. 154(b) by 0 days.

(21) Appl. No.: 17/397,764

(22) Filed: Aug. 9, 2021

(65) Prior Publication Data
US 2022/0042593 A1    Feb. 10, 2022

Related U.S. Application Data

(60) Provisional application No. 63/063,895, filed on Aug. 10, 2020.

(51) Int. Cl.
    *F16H 59/10*         (2006.01)
    *F16H 59/02*         (2006.01)

(52) U.S. Cl.
    CPC ....... *F16H 59/0278* (2013.01); *F16H 59/105* (2013.01); *F16H 2059/026* (2013.01)

(58) Field of Classification Search
    CPC ............. F16H 59/042; F16H 2059/026; F16H 59/0278; F16H 2025/2065; F16H 2025/2436; B60K 2370/128; G05G 1/04; G05G 1/12
    USPC ......................................................... 74/525
See application file for complete search history.

(56) References Cited

U.S. PATENT DOCUMENTS

| | | | | |
|---|---|---|---|---|
| 1,488,592 A | * | 4/1924 | Foster | F16H 61/26 74/473.33 |
| 2,557,056 A | * | 6/1951 | Schlein | F04B 9/14 74/525 |
| 6,173,622 B1 | * | 1/2001 | Carnevale | F16H 59/02 74/473.18 |
| 7,000,497 B1 | * | 2/2006 | Campbell | G05G 5/06 74/544 |
| 8,132,482 B2 | * | 3/2012 | Ciamillo | F16H 59/0278 74/525 |
| 9,003,917 B2 | * | 4/2015 | Geberth | F16H 59/04 74/473.33 |
| 10,330,190 B2 | * | 6/2019 | Luvison | G05G 1/04 |
| 2002/0124675 A1 | * | 9/2002 | Hashimoto | F16H 59/0208 74/473.29 |
| 2003/0079564 A1 | * | 5/2003 | Thiengtham | F16H 59/0278 74/525 |
| 2018/0093699 A1 | * | 4/2018 | Hetzel | B62D 3/08 |

FOREIGN PATENT DOCUMENTS

| | | | |
|---|---|---|---|
| JP | H08-192651 A | * | 7/1996 |
| JP | 2006056468 A | * | 3/2006 |

* cited by examiner

*Primary Examiner* — William C Joyce
*Assistant Examiner* — Gregory Robert Weber
(74) *Attorney, Agent, or Firm* — Alleman Hall Creasman & Tuttle LLP

(57) ABSTRACT

An adjustable shifter for a vehicle is provided. The adjustable shifter comprises a body, a shift shaft mounted within the body, and a height adjustment mechanism configured to adjust a height of the shift shaft relative to the body in a continuously adjustable manner throughout an operating height range of the shift shaft.

14 Claims, 8 Drawing Sheets

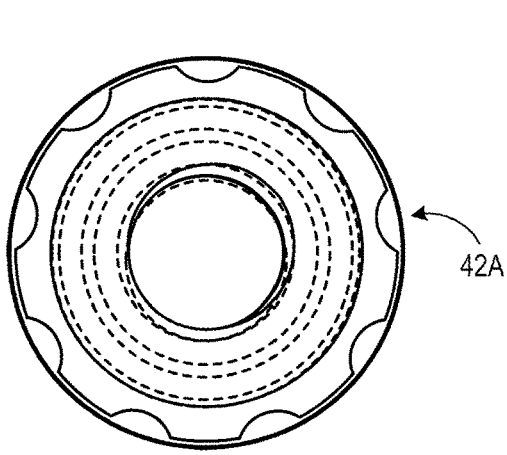
FIG. 4A
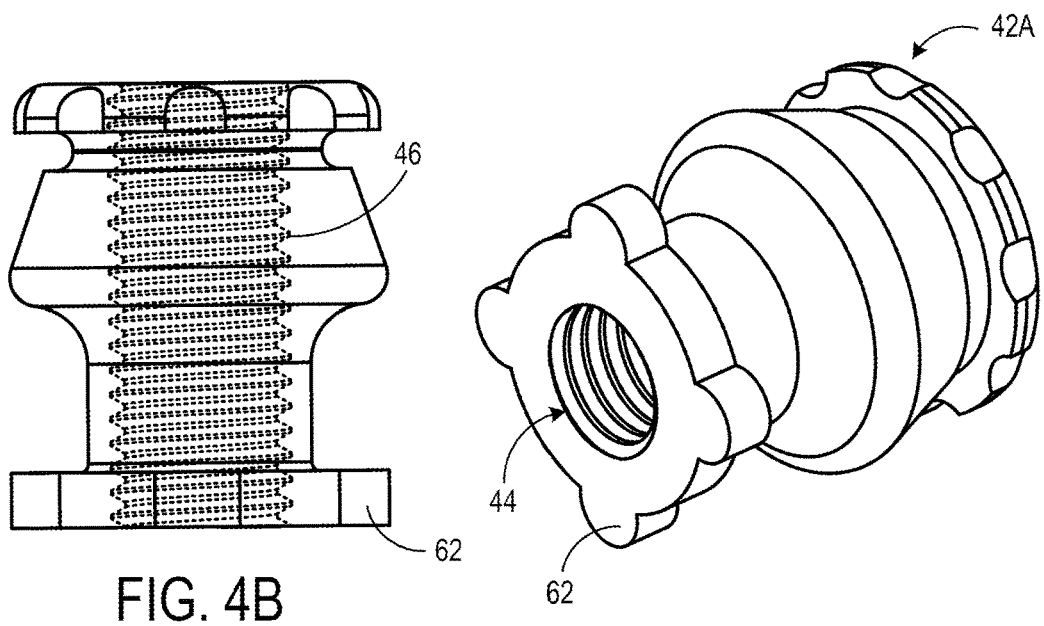
FIG. 4B
FIG. 4D
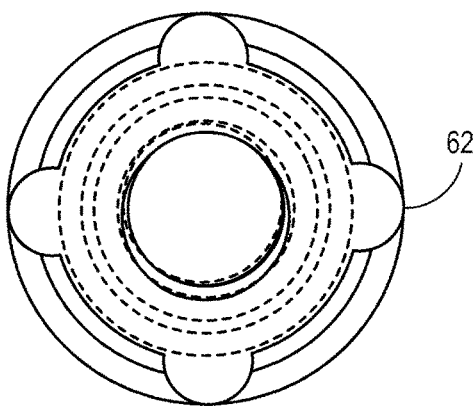
FIG. 4C

CONTINUOUSLY ADJUSTABLE SHIFTER FOR VEHICLE

CROSS-REFERENCE TO RELATED APPLICATIONS

This application claims priority to U.S. Provisional Patent Application Ser. No. 63/063,895, filed Aug. 10, 2020 and entitled CONTINUOUSLY ADJUSTABLE SHIFTER FOR VEHICLE, the entire disclosure of which is hereby incorporated herein by reference for all purposes.

BACKGROUND

Many vehicles have manual transmissions that allow selection of a gear by a vehicle operator via a shifter. The shifter may be a lever movable about a pivot and is typically disposed on a floor of the vehicle where it may be easily reached by a seated vehicle operator. The vehicle operator selects a gear by manually moving the shifter into one of a plurality of gear positions. Manual transmissions are typically equipped with stock shifters that have a fixed length. However, fixed length shifters have the drawback that they may not be ergonomically suitable for vehicle operators of differing statures, and they may feature too long or too short of a throw, i.e., the distance the shift knob of the shifter travels when shifting from one gear to another, for the operator's driving style. A challenge exists in engineering a shifter that quickly and easily adjusts to a comfortable position for the vehicle operator.

SUMMARY

To address the above issues, an adjustable shifter for a vehicle is provided. The adjustable shifter comprises a body, a shift shaft mounted within the body, and a height adjustment mechanism configured to adjust a height of the shift shaft relative to the body in a continuously adjustable manner throughout an operating height range of the shift shaft.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIGS. 4A to 4D show a top view, a side view, a bottom view, and a perspective view, respectively, of a shaft adjustment affordance included in the adjustable shifter of FIG. 1.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

Vehicle components that are adjustable to suit the comfort of the vehicle operator improve the driving experience and enhance safety for the operator and passengers of the vehicle. In vehicles with manual transmissions, it is especially important that shifting operations are smooth and comfortable. However, adjusting the shifter to a position that is ergonomically suitable for the vehicle operator can be challenging. While some shifters may include multiple mounting positions for a shift rod of the shifter that enables a vehicle operator to select from different mounting positions, these shifters suffer from significant drawbacks. First, since a set screw is used to adjust the mounting position, the vehicle operator is required to use tools in order to adjust the shifter height. Second, since the shifter is unusable as it is being adjusted, the shifter height can only be adjusted when the vehicle is stopped. Third, since the adjustment is achieved by moving the shifter among fixed mounting locations, the height level of the shifter is limited to the available positions. Fourth, adjusting shifter height in this manner may cause an undesired change in shifter angle, i.e. an angle defined as the angle between a longitudinal axis of the shifter and a horizontal plane, which may result in an unpleasant shifting feel for the vehicle operator. Fifth, under demanding driving activities, such as racing or off-road driving, a shifter that uses a set screw to secure the shift rod in a particular mounting location may have limited durability, leading to misalignment, breakage, and a need for frequent maintenance. A continuously adjustable shifter may provide a solution to such issues.

Figure 1:
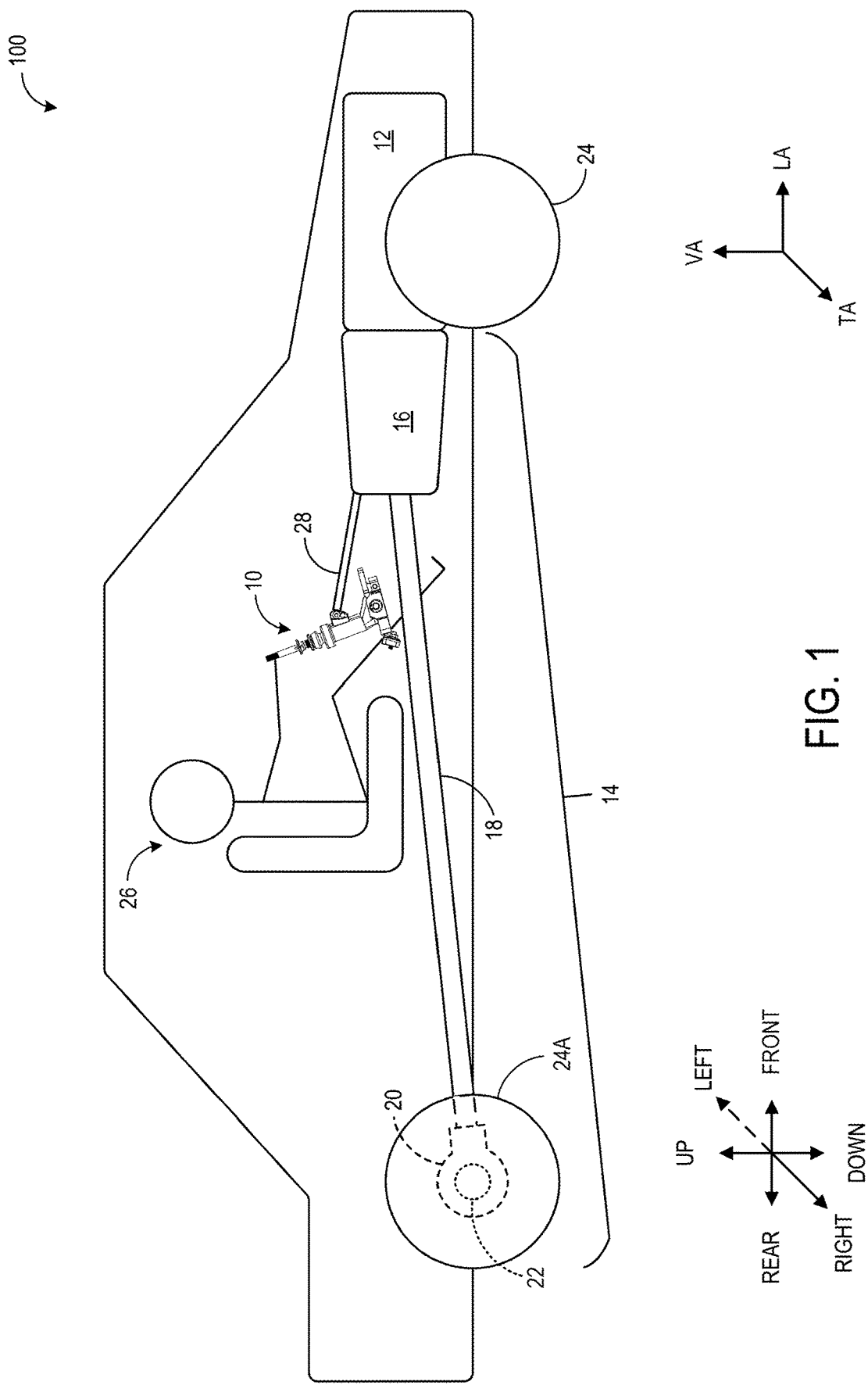
FIG. 1 is a schematic view of a vehicle having an adjustable shifter according to the present disclosure.

Turning to the figures, FIG. 1 shows an exemplary vehicle 100 having an adjustable shifter 10 in accordance with the disclosed embodiments of the present invention. The vehicle 100 includes an engine 12 and a drivetrain 14, with the drivetrain 14 comprising a transmission 16, a driveshaft 18, a differential 20, an axle 22, and at least one wheel 24. Typically, four wheels are provided, two or four of which are driven wheels 24A. The engine 12 provides power via a rotation of a crankshaft (not shown) through the drivetrain 14 in order to rotate the driven wheels 24A to thereby propel the vehicle 100. For a given rotational rate of the crankshaft, the transmission 16 is configured to vary a rotational rate of the driveshaft 18 by engaging one of a plurality of transmission gears. To engage one of the plurality of transmission gears, the adjustable shifter 10 is configured be manually moved by a vehicle operator 26 into one of a plurality of gear positions. The adjustable shifter 10 is configured to be movable along a transverse axis TA and a longitudinal axis LA of the vehicle 100. These axes are indicated in FIG. 1, along with a vertical axis VA. The adjustable shifter 10 engages one of the plurality of transmission gears via a selector arm 28. While the exemplary vehicle 100 of FIG. 1 is depicted as a rear-wheel drive vehicle, it will be appreciated that the vehicle 100 may be alternatively be a front-wheel drive vehicle, a four-wheel drive vehicle, an all-wheel drive vehicle, or any other vehicle in which the adjustable shifter 10 may be installed. Use of the adjustable shifter 10 in both on-road and off-road vehicles, as well as vehicles having more than four wheels, is contemplated.

Figure 2:
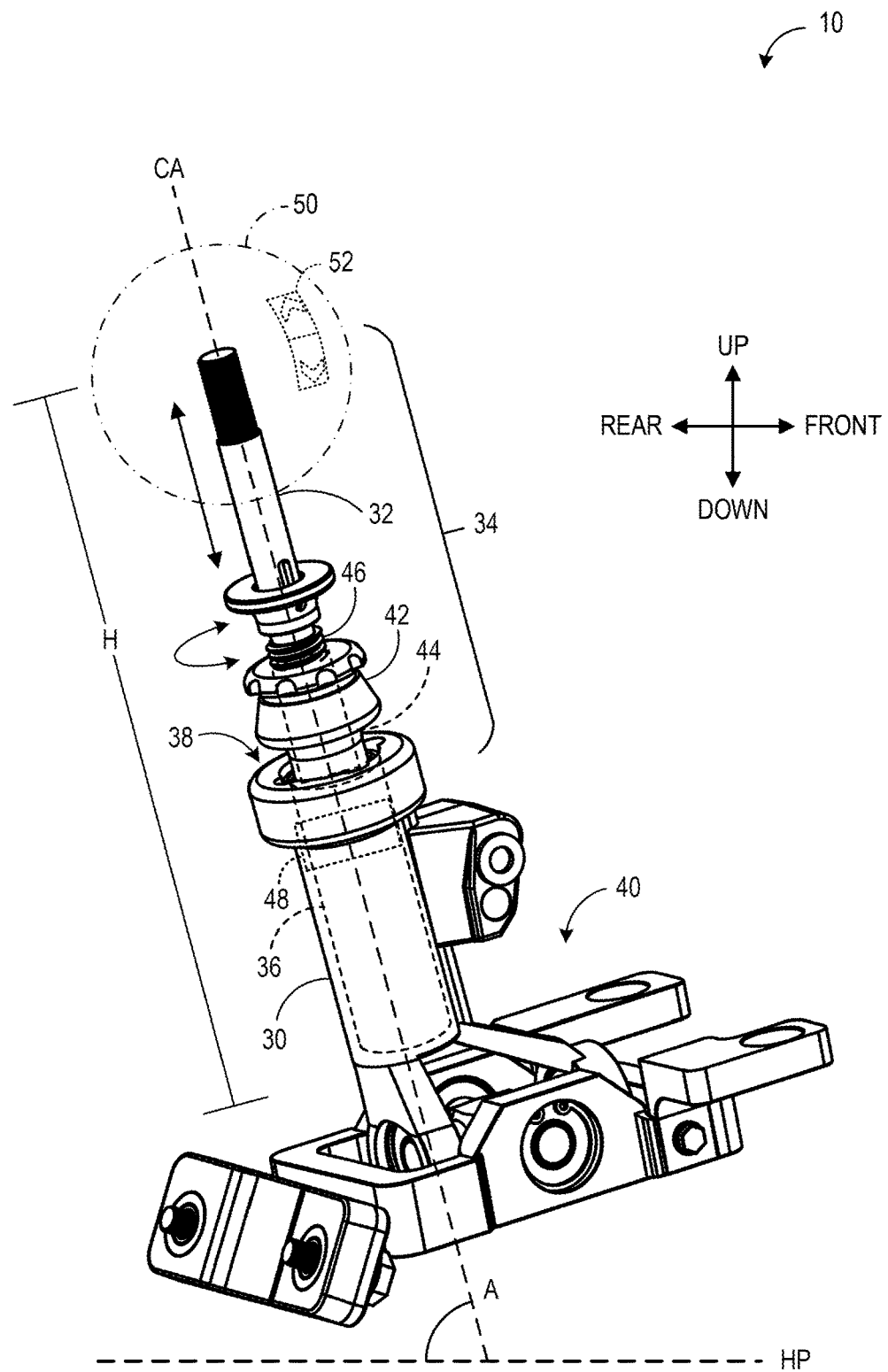
FIG. 2 is a perspective view of the adjustable shifter of FIG. 1.

Turning now to FIG. 2, a perspective view of the adjustable shifter 10 is provided. The adjustable shifter 10 comprises a body 30, a shift shaft 32 mounted within the body 30, and a height adjustment mechanism 34 configured to adjust a height H of the shift shaft 32 relative to the body 30 in a continuously adjustable manner throughout an operating height range of the shift shaft 32. The body 30 includes a bore 36 having top opening 38, and the shift shaft 32 is positioned so as to extend into the bore 36 via the top opening 38. As described in detail below, a base 40 secures the body of the adjustable shifter 10 to the vehicle 100.

The height adjustment mechanism 34 includes a shaft adjustment affordance 42 configured to be operated by the vehicle operator 26 during operation of the vehicle 100 to adjust the height of the adjustable shifter 10 in the continuous manner. The shaft adjustment affordance 42 includes a threaded hole 44 that is threadedly engaged with a lower threaded section 46 of the shift shaft 32. The shaft adjustment affordance 42 is configured to rotate around a central axis CA to cause the height H of the shift shaft 32 to be adjusted relative to the body 30. The central axis CA may be positioned at an angle A with respect to a horizontal plane HP.

In the illustrated configuration, the shaft adjustment affordance 42 is positioned proximate the top opening 38; however, it will be appreciated that the shaft adjustment affordance 42 may alternatively be placed in another location. For example, the shaft adjustment affordance 42 may be placed in the middle of the body 30 of the adjustable shifter 10. Also in the illustrated configuration, the shaft adjustment affordance 42 is configured to be turned by a hand of the vehicle operator 26 in order to adjust the height H of the shift shaft 32. Advantages of this configuration include ease of manufacture, simplicity of use, and low maintenance requirements.

In another configuration, the height H of the shift shaft 32 is adjusted with the aid of an electric motor 48, as indicated by dashed line in FIG. 2. The electric motor 48 may engage directly with the lower threaded section 46 of the shift shaft via a worm gear, for example, or indirectly via the shaft adjustment affordance 42 (i.e., the motor 48 may be configured to rotate the shaft adjustment affordance 42). The vehicle operator 26 may adjust the height H of the shift shaft 32 via a button, switch, or lever positioned on a shifter knob 50 attached to an upper end of the shift shaft 32 and configured to operate the motor 48. An example rocker switch 52 is shown in FIG. 2, which is configured to allow the operator 26 to adjust the height H of the shift shaft 32 up or down along the central axis CA. One or more desired shift shaft heights may be saved in memory of an onboard computer of the vehicle as part of a vehicle operator profile in which vehicle settings for one or more vehicle operators are recorded.

Figure 3A:
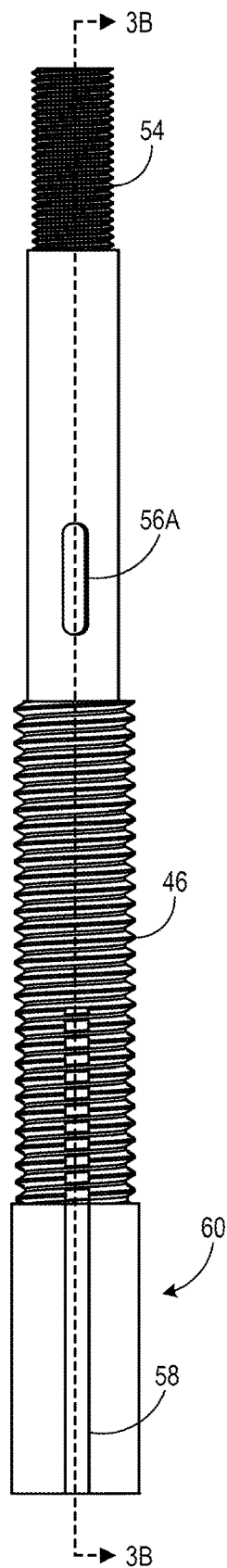
FIGS. 3A to 3C show a side view, a sectional view, and a perspective end view, respectively, of a shift shaft included in the adjustable shifter of FIG. 1.
Figure 3B:
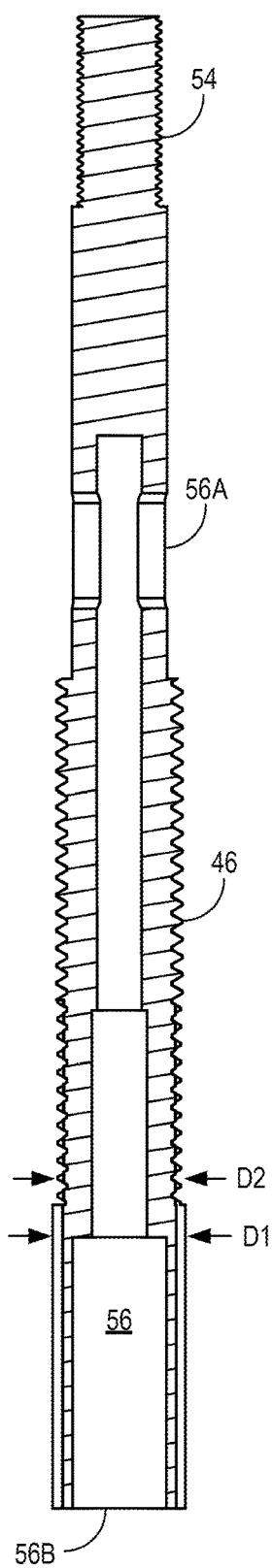
Figure 3C:
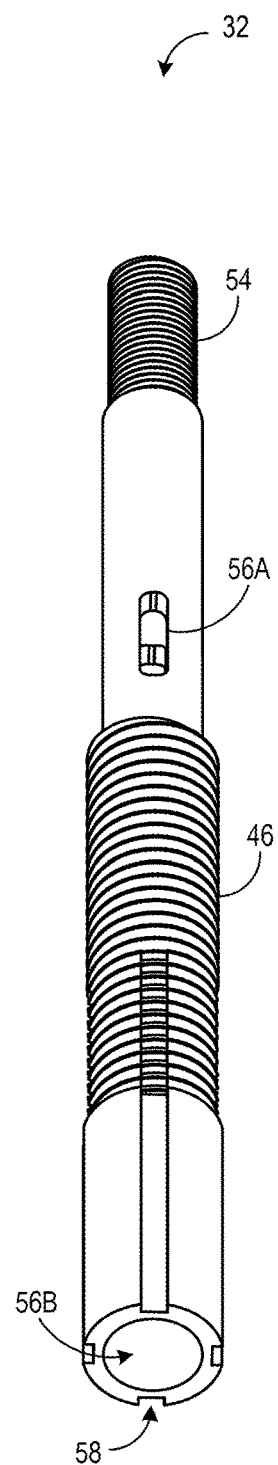

FIGS. 3A, 3B, and 3C show a side view, a sectional view, and a perspective end view, respectively, of the shift shaft 32. As illustrated in FIG. 3A, the shift shaft 32 includes an upper threaded section 54 configured such that the shifter knob 50 or shifter handle having complementary threads may be attached to the shift shaft 32, and a lower section 60. In another configuration, the shift shaft 32 may be configured to attach to the shifter knob 50 or shifter handle via a bolt or other fastening mechanism. As shown in the sectional view of FIG. 3B taken along line 3B of FIG. 3A, a diameter D1 of the lower section 60 is larger than a diameter D2 of the lower threaded section 46. This configuration prevents the shift shaft 32 from being removed from the body 30 during adjustment of the height H of the shift shaft 32, as the diameter D1 of the lower section 60 is too large to pass through the shaft adjustment affordance 42 that is threadedly engaged with the lower threaded section 46 of the shift shaft 32.

As illustrated, the shift shaft 32 includes a shift shaft bore 56 having an upper bore opening 56A and a lower bore opening 56B. As described above, the shift shaft 32 is configured to accommodate an additional component (e.g. a button, switch, or lever such as the rocker switch 52) mounted to the adjustable shifter 10 via the shifter knob 50. The additional component may have wires, cables, or tubes that may enter the upper bore opening 56A, pass through the shift shaft bore 56, exit the lower bore opening 56B, and attach to a component of the vehicle 100. Such a configuration may accommodate features such as a reverse lockout mechanism or a nitrous oxide switch, for example. The shift shaft 32 also includes at least one keyway 58 arranged in the lower section 60, as shown in FIGS. 3A and 3C and described in detail below.

FIGS. 4A, 4B, 4C, and 4D show a top view, a side view, a bottom view, and a perspective view, respectively, of the shaft adjustment affordance 42. As illustrated in top view and bottom view of FIGS. 4A and 4C, the shaft adjustment affordance 42 has a substantially circular shape. In another configuration, when viewed from top or bottom, the shaft adjustment affordance 42 may have an oblong, triangular, square, hexagonal, or any other shape that the vehicle operator finds comfortable. As described above and shown in FIG. 4B, the shaft adjustment affordance 42 is threadedly engaged with a lower threaded section 46 of the shift shaft 32 via the threaded hole 44, which is illustrated in FIG. 4D. While the side view and perspective views of FIGS. 4B and 4D show the shaft adjustment affordance 42 to have a substantially smooth outer surface, an upper portion of the shaft adjustment affordance 42 includes indentations 42A to assist the operator 26 in securely grasping the shaft adjustment affordance 42. It will be appreciated that the shaft adjustment affordance 42 may be alternatively configured with ridges, knurling, or other texture to enhance a grip of the operator 26 on the shaft adjustment affordance 42. The shaft adjustment affordance 42 may also be configured with marks organized in a radial fashion about the circumference of the shaft adjustment affordance 42. Such marks may include tick marks or numerical marks that turn as the shaft adjustment affordance 42 turns to provide a visual indication of the position of the adjustable shifter 10. For example, when viewed in relation to another feature (e.g. complementary and stationary marks on the body 30 of the adjustable shifter 10), the marks may indicate to the vehicle operator 26 a value (e.g. a numerical value) for the height H of the shift shaft 32. As shown, the shaft adjustment affordance 42 includes at least one axial key 62, the function of which is described below.

Figures 5A, 5B:
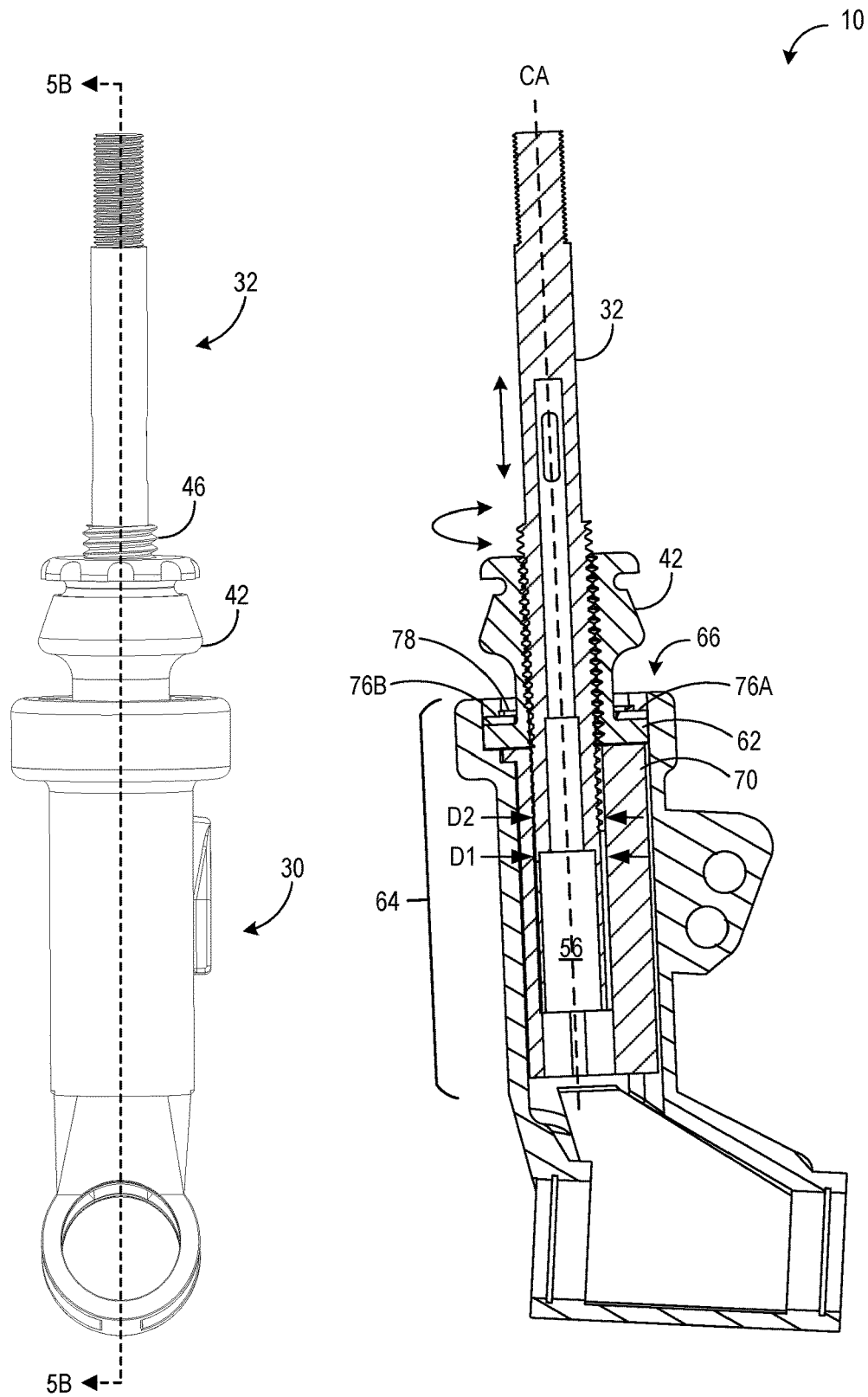
FIGS. 5A and 5B show a front view and a sectional view of the adjustable shifter of FIG. 1.

Turning now to FIGS. 5A and 5B, a front view and a sectional view of the adjustable shifter 10 are provided. As described above, the shaft adjustment affordance 42 is configured to rotate to cause the height H of the shift shaft 32 to be adjusted relative to the body 30. Once the height H of the shift shaft 32 has been adjusted, it is desirable that the vehicle operator 26 be prevented from inadvertently changing the height H of the shift shaft 32 during normal operation of the vehicle 100. In order to allow rotation of the shaft adjustment affordance 42 during a height adjustment, the shaft adjustment affordance 42 is coupled to the body 30 by a retaining mechanism 64 that permits rotational motion of the shaft adjustment affordance 42. In order to prevent translation of the shift shaft 32 relative to the body 30 during operation of the vehicle 100, the retaining mechanism 64 constrains longitudinal motion of the shaft adjustment affordance relative to the central axis CA of the shift shaft 32. As described above, the diameter D1 of the lower section 60 of the shift shaft 32 is larger than the diameter D2 of the lower threaded section 46, which prevents passage of the lower section 60 through the threaded hole 44 of the shaft adjustment affordance 42, thereby preventing removal of the shift shaft 32 from the body 30 during adjustment. In another configuration, preventing the shift shaft 32 from being completely removed from the body 30 during adjustment may be accomplished by another mechanism such as a retaining pin disposed on the lower section 60 of the shift shaft 32.

Figure 6:
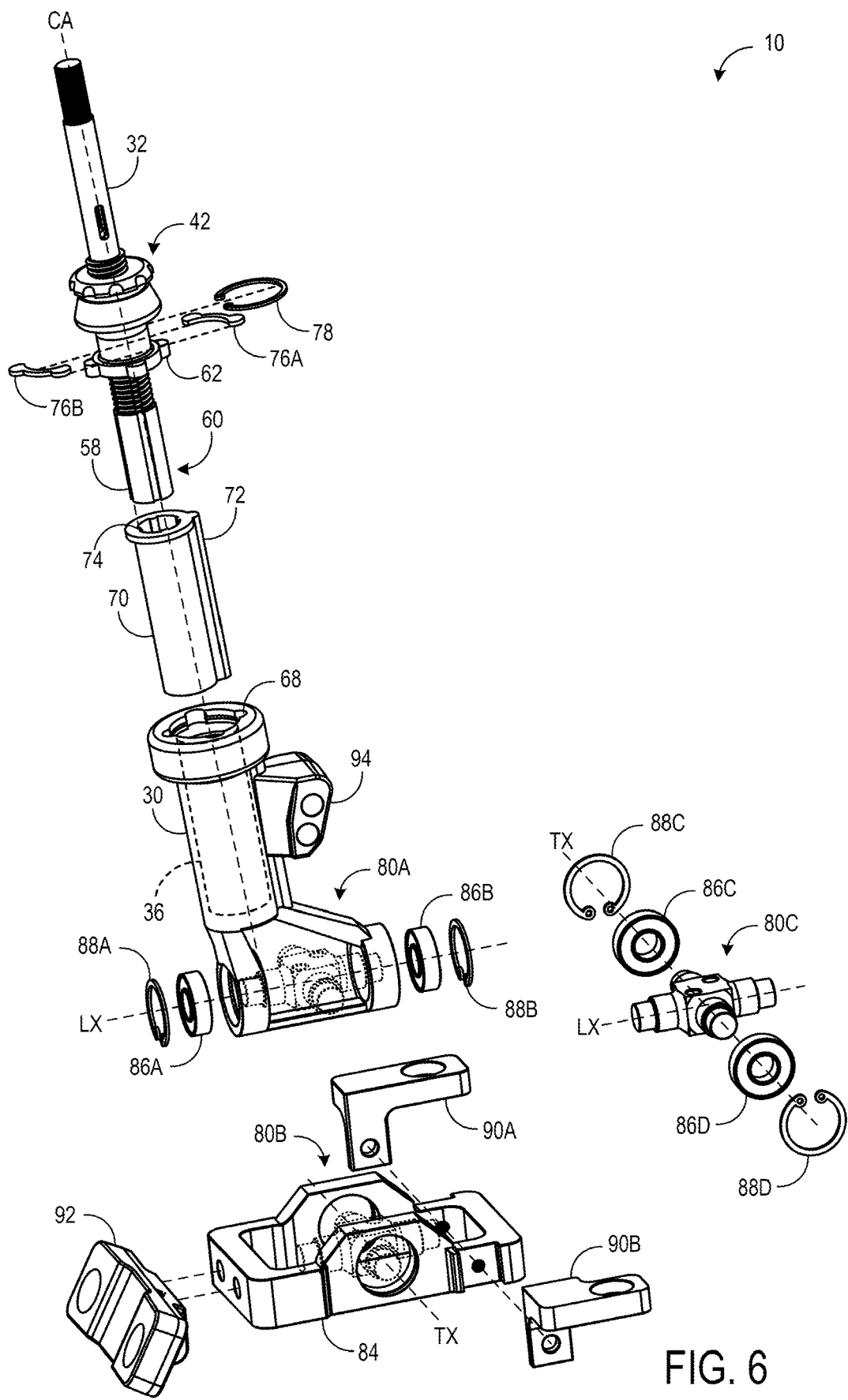
FIG. 6 is an exploded view of the adjustable shifter of FIG. 1.

With reference to the exploded view of the adjustable shifter 10 shown in FIG. 6, the retaining mechanism 64 includes a keyed joint 66 formed between the shaft adjustment affordance 42 and the body 30. The keyed joint 66 includes at least one axial key 62 formed on the shaft adjustment affordance 42 and at least one corresponding axial keyway 68 formed on an inner surface of an upper portion of the body 30. A shift shaft journal bushing 70 that receives the lower section 60 of the shift shaft 32 is non-rotatably secured within the bore 36 of the body 30 via at least one outer longitudinal key 72 that corresponds the axial keyway 68 of the body 30. The lower section 60 of the shift shaft 32 is non-rotatably secured within the shift shaft journal bushing 70 by at least one inner longitudinal key 74 formed on an inner surface of the shift shaft journal bushing 70 that engages the keyway 58 formed on the outer surface of the shift shaft 32. To minimize play between components of the retaining mechanism, at least one key joint shim 76 may be placed in the keyed joint 66 of the retaining mechanism 64. The at least one key joint shim 76 is held in place with a retaining ring 78 placed thereatop. In some configurations, two key joint shims 76A, 76B may be placed on opposite sides of the shaft adjustment affordance 42 to secure the components of the keyed joint 66, as shown in FIG. 6.

It will be appreciated that the shift shaft journal bushing 70 is formed from a material other than those that form the shift shaft 32 and the body 30 of the adjustable shifter 10, and is configured to receive a majority of wear and tear of the adjustable shifter 10 during normal use. By limiting the wear and tear to one component, maintenance of the adjustable shifter 10 may be minimized. However, it will be appreciated that the retaining mechanism may be configured without the shift shaft journal bushing 70 such that the bore 36 of the body 30 and the shift shaft 32 are in direct contact. In such a configuration, the body 30 includes a longitudinal key that corresponds to the keyway 58 formed in the shift shaft 32, and the key and the keyway engage as described above such that relative rotation between the shift shaft 32 and the body 30 is restricted. In an alternative configuration that also functions to restrict relative rotation between the shift shaft 32 and the body 30, the lower section 60 of the shift shaft 32 is noncircular when viewed from an end. In this configuration, the bore 36 of the body 30 has a complementary noncircular shape, thus preventing relative rotation between the shift shaft 32 and the body 30. An advantage of this configuration is that the noncircular shape of the lower section 60 of the shift shaft 32 prevents the lower section 60 of the shift shaft 32 from passing through the threaded hole 44 of the shaft adjustment affordance 42, thereby preventing inadvertent removal of the shift shaft 32 from the body 30.

Continuing with FIG. 6, the body 30 further includes an upper joint portion 80A, a lower joint portion 80B, and a cross (i.e., spider) 80C, which collectively form a universal joint 82 (U-joint). The upper joint portion 80A is configured to nest within the lower joint portion 80B, which is formed in the base 40 of the adjustable shifter 10. The cross 80C is configured to engage with the upper joint portion 80A along a longitudinal axle LX via bearings 86A, 86B, and with the lower joint portion 80B along a transverse axle TX via bearings 86C, 86D. The bearings 86A, 86B, 86C, 86D are secured to the cross 80C with retaining rings 88A, 88B, 88C, 88D, respectively. The U-joint 82 allows the adjustable shifter 10 to pivot about the longitudinal axle LX and the transverse axle TX at a central point CP of the cross 80C. The cross 80C is shown in dashed line in FIG. 6 to illustrate its respective positions in the upper joint portion 80A and the lower joint portion 80B when the U-joint 82 is in an assembled state.

The base 40 is configured to attach to a portion of the vehicle 100 (e.g. a chassis of the vehicle) via a pair of front mounting brackets 90A, 90B and a base plate 92, thus immobilizing the base 40 of the adjustable shifter 10 relative to the vehicle 100. It will be appreciated that the front mounting brackets 90A, 90B and the base plate 92 may be removably attached to the base 40 via fasteners such as bolts, for example, which permits the adjustable shifter 10 to be installed in a variety of vehicles simply by selecting mounting brackets and/or a base plate that are compatible with the desired vehicle. As described in detail below with reference to FIG. 8, the body 30 of the adjustable shifter 10 includes a multi-position connection point 94 for a selector arm 96 that attaches to the transmission 16 of the vehicle 100, thereby providing further versatility to facilitate the installation and use of the adjustable shifter 10 in a broad range of vehicles.

Figure 7:
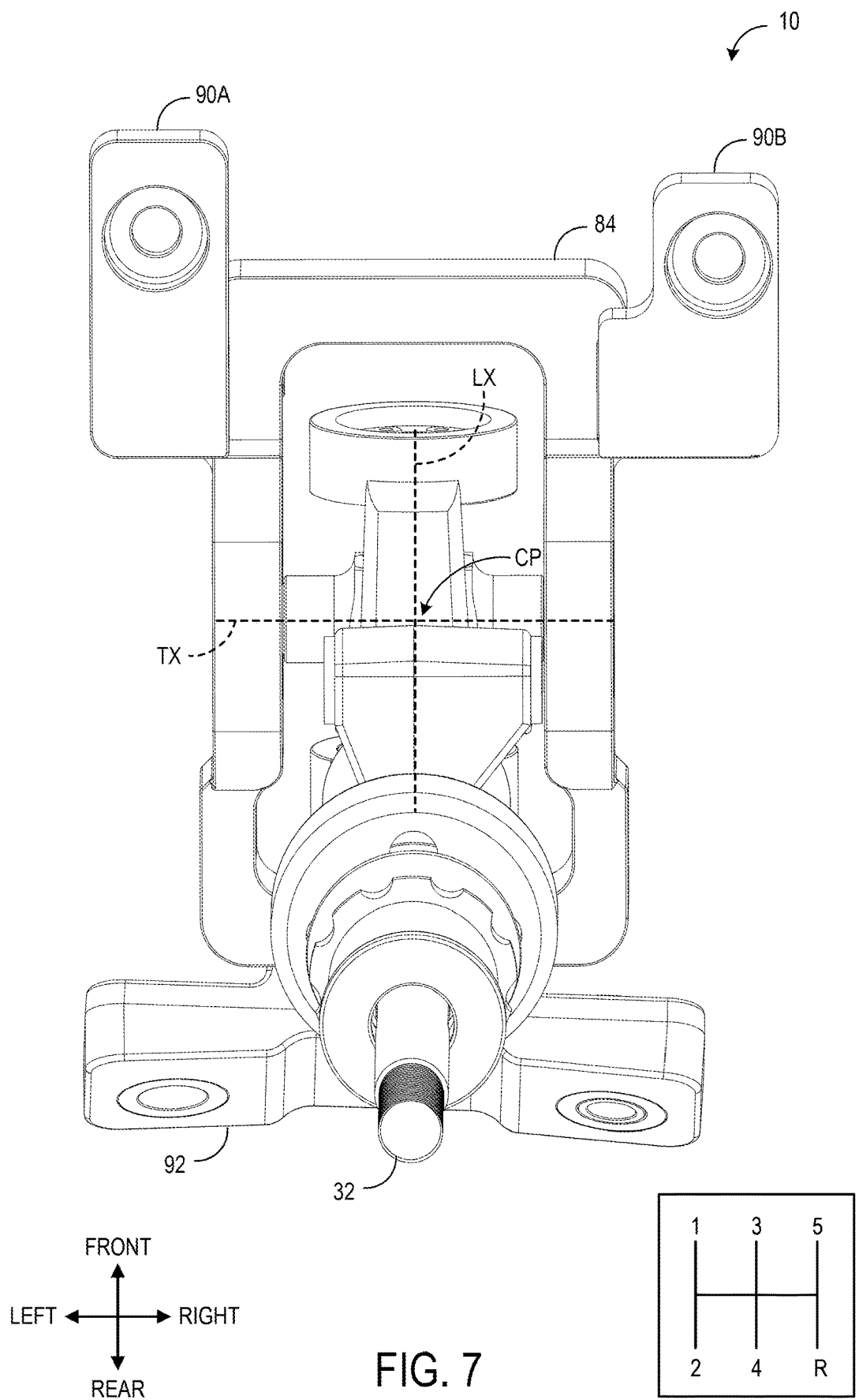
FIG. 7 is a top view of the adjustable shifter of FIG. 1.

Turning now to FIG. 7, a top view of the adjustable shifter 10 similar to a view afforded to the vehicle operator 26 during operation of the vehicle 100 is provided. With the above described configurations, the adjustable shifter 10 may pivot around the longitudinal axle LX to move from left to right or vice versa, and the adjustable shifter 10 may pivot around transverse axle TX to move from front to rear or vice versa. Thus, any one of the plurality of gear positions may be selected. A gear position layout is provided having five forward gear position (e.g., 1-5) and a reverse gear position (R). It will be appreciated that this gear position layout is exemplary, and that the adjustable shifter 10 may accommodate other gear position layouts have fewer gear positions or more gear positions. Furthermore, gear position layouts are typically determined by the transmission rather than any feature of the adjustable shifter 10. Therefore, the adjustable shifter 10 may be installed in vehicles having any one of a wide variety of transmissions.

Figure 8:
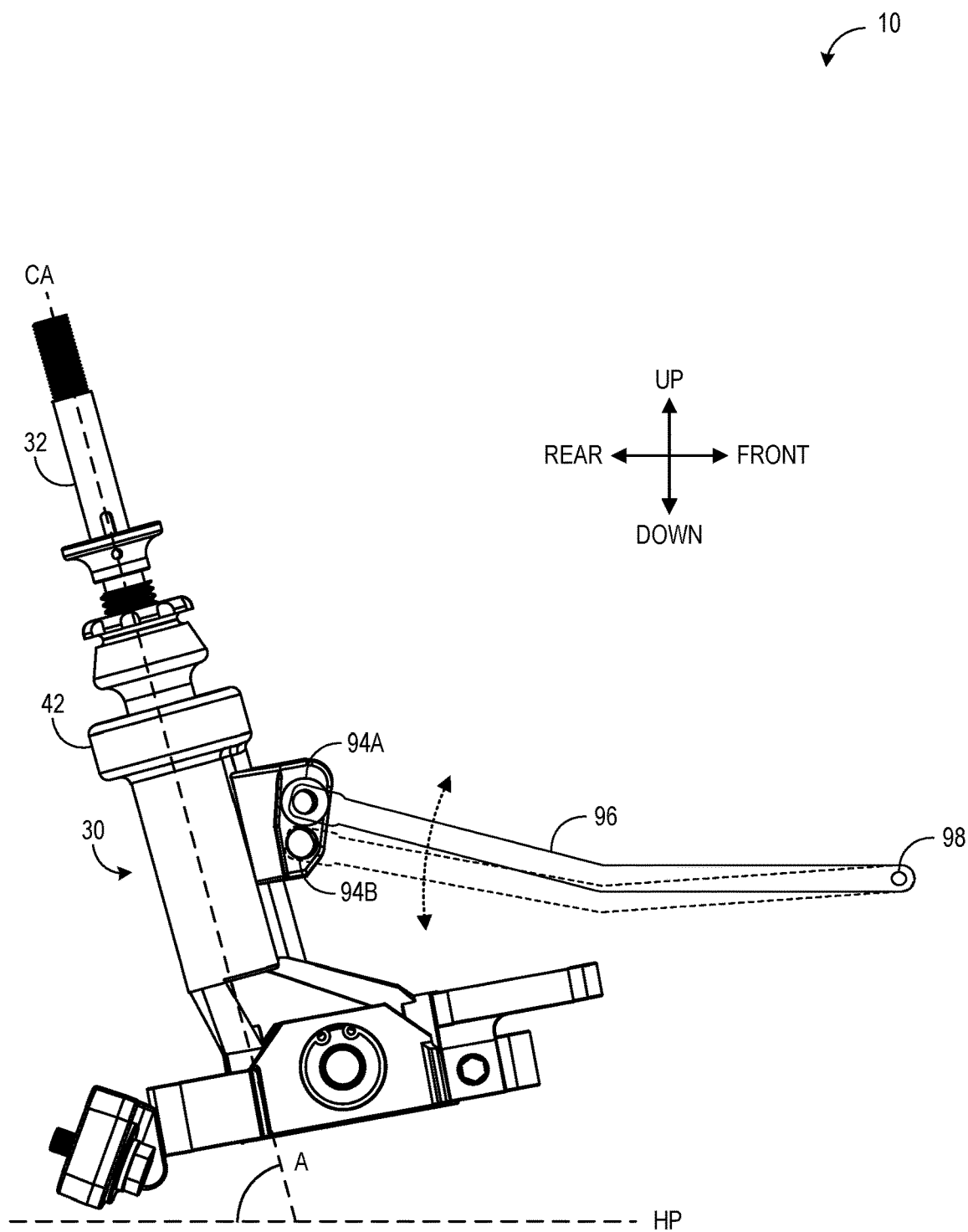
FIG. 8 is a side view of the adjustable shifter of FIG. 1 engaged with a selector arm.

Turning now to FIG. 8, additional features of the adjustable shifter 10 allowing adjustment of the shifter throw will now be described. The body 30 of the adjustable shifter 10 includes a plurality of selector arm connection points 94, any one of which may be used to connect the body 30 to the selector arm 96 via a bolt or other fastening mechanism. The selector arm 96 includes a transmission connection point 98 at which the selector arm 96 is attached to the transmission 16. In order to change gears (move from one gear position to another), movement of the adjustable shifter 10 is transmitted to the transmission 16 through the selector arm 96. By changing the selector arm connection point 94 used to connect the selector arm 96 to the body 30, the shifter throw may be increased or decreased. For example, when the selector arm 96 is connected to the body 30 via an upper selector arm connection point 94A, the shifter throw is shorter than when the selector arm 96 is connected to the body 30 via a lower selector arm connection point 94B.

As shown in FIG. 8, the selector arm connection points 94A, 94B are configured to lie on an arc defined by a point on the selector arm as the selector arm rotates about the transmission connection point. This configuration allows the shifter angle A, i.e. an angle defined as the angle between the central axis CA of the adjustable shifter 10 and the horizontal plane HP, to remain constant regardless of which selector arm connection point is used. An advantage of this configuration is that the shifter throw may be changed without changing the shifter angle A to which the vehicle operator may be accustomed.

It will be appreciated that while the illustrated configuration includes two connection points, alternative configurations may include a plurality of intermediate selector arm connection points to provide intermediate throw lengths. Alternatively, the adjustable shifter 10 may be configured such that rather than a discrete number of selector arm connection points 94, the selector arm 96 may connect to the body 30 via a continuous selector arm connection channel. Such a configuration allows adjustment of the shifter throw in a continuously adjustable manner throughout an operating shifter throw range of the adjustable shifter. As discussed above with regard to adjustment of the shifter height H, the adjustable shifter 10 may be configured such that adjustment of shifter throw is be aided by an electric motor.

The configurations described herein provide a mechanism for adjusting a height of an adjustable shifter, and for adjusting a shifter throw in order to accommodate differences among vehicle operators including stature, driving style, and personal preference. Additionally, the adjustable shifter of the present disclosure allows both adjustment of the height and shifter throw of the adjustable shifter in a continuous manner while preventing the vehicle operator from inadvertently changing height or shifter throw of the adjustable shifter. Furthermore, design elements of the adjustable shifter provide increased durability, increased ease of adjustment, and lower maintenance requirements when compared to conventional adjustable shifters. Thus, the adjustable shifter of the present disclosure is well-suited for everyday driving as well as demanding driving activities.

The invention claimed is:

1. An adjustable shifter for a vehicle, the adjustable shifter comprising:
   a body;
   a shift shaft mounted within the body; and
   a height adjustment mechanism configured to adjust a height of the shift shaft relative to the body in a continuously adjustable manner throughout an operating height range of the shift shaft, wherein
   the height adjustment mechanism includes a shaft adjustment mechanism configured to be operated by a vehicle operator to adjust the height of the adjustable shifter in the continuous manner,
   the shaft adjustment mechanism includes a threaded hole that is threadedly engaged with a lower threaded section of the shift shaft, the shaft adjustment mechanism being configured to rotate to cause the height of the shift shaft to be adjusted relative to the body,
   the shaft adjustment mechanism is coupled to the body by a retaining mechanism that permits rotational motion and constrains longitudinal motion of the shaft adjustment mechanism relative to a longitudinal axis of the shift shaft, and
   the retaining mechanism includes a keyed joint formed between the shaft adjustment mechanism and the body.

2. The adjustable shifter of claim 1, wherein
   the body includes a bore having a top opening,
   the shift shaft is positioned so as to extend through the top opening into the bore, and
   the shaft adjustment mechanism is positioned proximate the top opening.

3. The adjustable shifter of claim 2, wherein
   the keyed joint includes:
   at least one axial key formed on the shaft adjustment mechanism; and
   at least one corresponding axial keyway formed at the top opening of the bore.

4. The adjustable shifter of claim 1, wherein
   the body includes a bore having a top opening,
   a shift shaft journal bushing is disposed within the bore, the shift shaft journal bushing being configured to receive a lower section of the shift shaft, and
   the shaft adjustment mechanism is positioned proximate the top opening of the bore.

5. The adjustable shifter of claim 4, wherein
   the shift shaft journal bushing is non-rotatably secured within the bore via an outer longitudinal key that engages an axial keyway formed in the body.

6. The adjustable shifter of claim 4, wherein
   the lower section of the shift shaft is non-rotatably secured within the shift shaft journal bushing by an inner longitudinal key formed on an inner surface of the shift shaft journal bushing that engages a keyway formed on an outer surface of the shift shaft.

7. The adjustable shifter of claim 1, wherein
   the retaining mechanism includes a retaining ring.

8. The adjustable shifter of claim 1, wherein
   the body includes a key,
   the shift shaft includes a keyway, and
   the key and the keyway engage such that relative rotation between the shift shaft and the body is restricted.

9. The adjustable shifter of claim 1, wherein
   the body further includes an upper joint portion, and the adjustable shifter further comprises:
   a base including a lower joint portion, wherein
   the upper joint portion of the body and the lower joint portion of the base concurrently engage a cross to form a universal joint; and
   the base is attached to a portion of the vehicle.

10. The adjustable shifter of claim 9, wherein
    the cross is configured to engage with the upper joint portion along a longitudinal axle via a first set of bearings,
    the cross is configured to engage with the lower joint portion along a transverse axle via a second set of bearings, and
    the universal joint allows the adjustable shifter to pivot about the longitudinal axle and the transverse axle at a central point of the cross.

11. The adjustable shifter of claim 9, wherein
    the base is configured to attach to a chassis of the vehicle via a pair of front mounting brackets and a base plate to thereby immobilize the base of the adjustable shifter relative to the vehicle.

12. The adjustable shifter of claim 11, wherein
    the pair of front mounting brackets are removably attached to the base via fasteners to thereby permit the pair of front mounting brackets to be interchangeable according to a type of vehicle in which the adjustable shifter is to be installed.

13. The adjustable shifter of claim 11, wherein
the base plate is removably attached to the base via fasteners to thereby permit the base plate to be interchangeable according to a type of vehicle in which the adjustable shifter is to be installed.

14. The adjustable shifter of claim 1, wherein
the body further includes a multi-position connection point for a selector arm configured to attach to a transmission of the vehicle.

\* \* \* \* \*